March 22, 1966 W. R. HORTON 3,241,650
APPARATUS FOR FACILITATING THE PACKAGING OF FRUIT
Filed Jan. 7, 1964 3 Sheets-Sheet 1

INVENTOR.
WALTER R. HORTON
BY
Paul A. Weilein
ATTORNEY

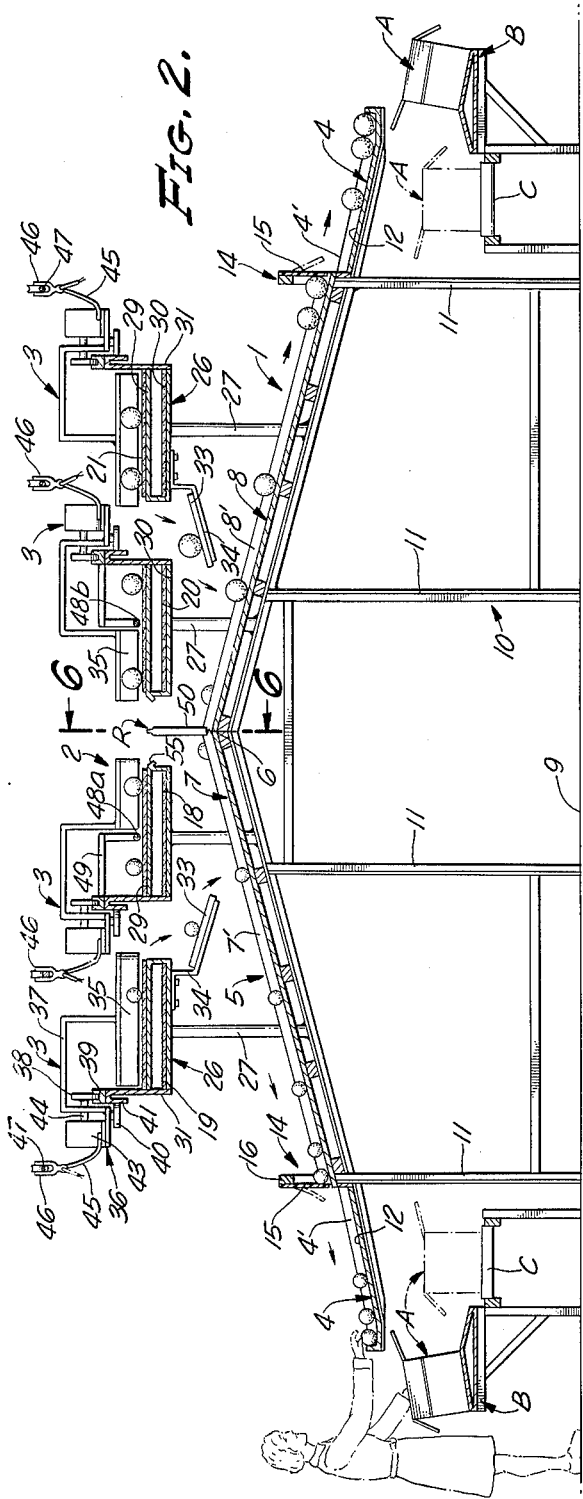

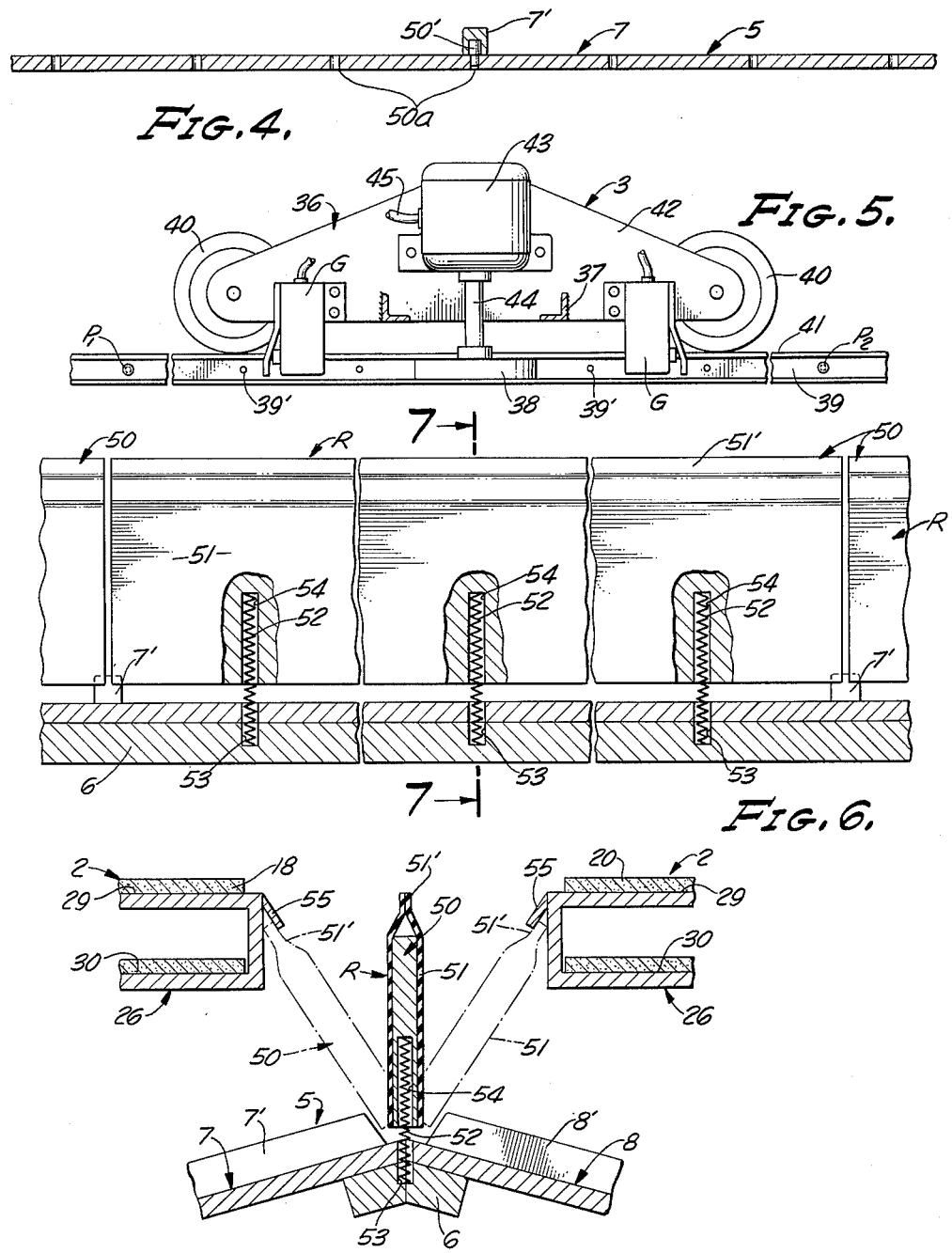

United States Patent Office 3,241,650
Patented Mar. 22, 1966

3,241,650
APPARATUS FOR FACILITATING THE
PACKAGING OF FRUIT
Walter R. Horton, Upland, Calif., assignor to Sunkist Growers, Inc., Los Angeles, Calif., a corporation of California
Filed Jan. 7, 1964, Ser. No. 336,279
15 Claims. (Cl. 198—19)

This invention relates to the packaging of fruit and more particularly to apparatus for handling and distributing fruit to facilitate the packaging thereof.

It is the primary object of this invention to provide novel and highly efficient apparatus of the character above noted for uniformly distributing fruit to a plurality of packing stations without injuring the fruit and in such a manner that large quantities of the fruit may be quickly and easily packed in suitable containers.

It is another object of this invention to provide apparatus such as described which constitutes a novel unitized structure comprising a packing table and conveyor means wherein the conveyor means advances the fruit over the table and cooperates therewith to distribute fruit uniformly to the packing stations on the table.

It is an additional object of this invention to provide apparatus such as next above noted wherein the elongate packing table is provided along opposite longitudinal margins with a plurality of packing stations and said conveyor means are operable selectively to distribute fruit of different sizes to different packing stations on the table.

A further object of this invention is to provide apparatus such as described wherein the conveyor means includes endless belt means and traveling distributing means movable over the belt means for deflecting fruit laterally off the belt means so as to drop onto the table, the traveling distributing means being movable with as well as relative to the belt to effect a controlled and selective distribution of the fruit to the packing stations along the table.

Additionally, it is an object of this invention to provide apparatus such as next above described wherein the conveyor means includes a plurality of conveyor belts each of which is comparatively narrow so as to minimize lateral travel of the fruit over the belts in movement of the fruit therefrom, since injury of the fruit is minimized with minimization of lateral travel of the fruit on the belts.

It is another object of this invention to provide apparatus such as hereinbefore described wherein the elongate packing table is constructed to form a plurality of packing station bins at lower portions of oppositely inclined upper surfaces of the table, whereby fruit dropping off of the belts extending over these inclined surfaces will gravitate into the packing bins. The arrangement of the belts and table is such that each belt has one longitudinal margin closer to the inclined surface of the table therebeneath than the other longitudinal margin and the fruit is moved off this one margin so as to reduce the length of the drop of the fruit onto the table and thereby prevent injury of the fruit.

An important object of this invention is to provide apparatus such as herein described which readily lends itself to efficient use in connection with apparatus for sizing fruit, in that the plurality of conveyor belts and the table of the present invention as a unit may be disposed and operated as an adjunct of the sizing apparatus, with fruit of different sizes discharging from the sizing apparatus onto the different conveyor belts. These belts with the traveling distributing means thereon are operable selectively to distribute fruit of different sizes to predetermined packing station bins along the longitudinal margins of the table to thereby facilitate packaging of the fruit according to sizes thereof.

It is an additional object of this invention to provide apparatus such as described wherein an elongate packing table having two downwardly inclined upper surfaces, is provided with novel means optionally operable at different locations along the table, to direct fruit dropped from belts overlying both inclined surfaces exclusively onto one or the other of the inclined surfaces of the table or to cause the belts over each inclined surface to drop the fruit exclusively onto the surface therebeneath in all cases to facilitate packaging of the fruit.

A further object of this invention is the provision in apparatus such as described of novel divider or partition means extending lengthwise on the belts to afford the transmission of fruit of different sizes on portions of the same belt, thereby making it possible for the apparatus of this invention to handle a large volume of fruit of different sizes with relatively narrow and closely spaced conveyor belts and consequent reduction in the width of the packing table and a more compact arrangement of the apparatus as a whole.

Another object of this invention is the provision in apparatus of the character described of power driven distributing units operable along the conveyor belts for movement at the same speed as the belts or at different speeds than the belt, in all instances for a control of the distribution of the fruit from the belts onto the packing table, to prevent bunching of the fruit on the table and to enable a uniform distribution of the fruit to selected packing station bins on the table.

A further object of this invention is to provide a novel arrangement of the power driven distributing units and means for controlling the extent of back and forth movement of the units along the belts over the packing table, there being circuit closers on the units and actuating members for the circuit closers along the tracks for the units, the actuating members being adjustable so that the length of travel of the units may be varied with respect to the belts best to control the distribution of the fruit to packing stations along the table.

Anoher object of this invention is the provision of a pack table of the character described wherein the plurality of partitions on the table as well as those for defining the plurality of packing bins in which fruit is collected along the edges of the table are adjustable to vary the size of the spaces on the table between the partitions as well as the size of the bins in accordance with the amount of fruit of particular sizes to be deposited in the bins.

Other objects and advantages of the invention will be hereinafter described or will become apparent to those skilled in the art, and the novel features of the invention will be defined in the appended claims.

Referring to the drawings:

FIG. 2 is a section view on an enlarged scale taken on the line 2—2 of FIG. 1;

FIG. 3 is a fragmentary sectional view taken substantially on the line 3—3 of FIG. 1 on an enlarged scale;

FIG. 4 is a fragmentary sectional view taken on the line 4—4 of FIG. 3;

FIG. 5 is a fragmentary plan view on an enlarged scale of one of the traveling fruit distributing units having circuit closers thereon arranged to be operated when engaged with actuating pins positioned along the track for the unit;

FIG. 6 is a fragmentary sectional view on an enlarged scale taken on the line 6—6 of FIG. 2; and FIG. 7 is a sectional view taken on the plane of line 7—7 of FIG. 6.

Figure 1:
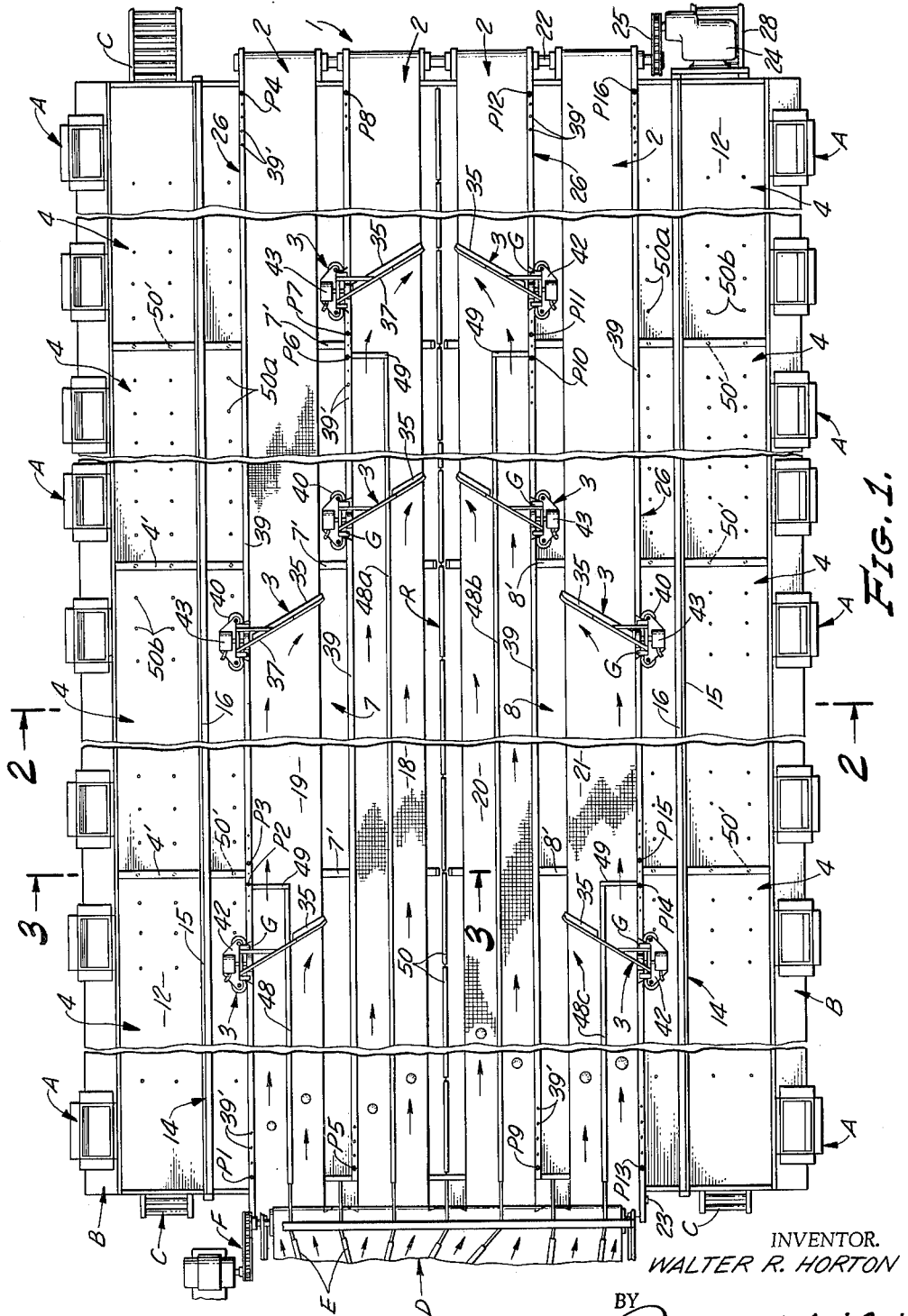
FIG. 1 is a fragmentary top plan view of apparatus embodying the present invention.

An illustrative embodiment of this invention as shown in the accompanying drawings generally comprises a packing table 1 over which conveyor means 2 including traveling distributing means 3 are operable to cause fruit to be deposited onto the table. The table is constructed so that the fruit deposited thereon will gravitate into open bins 4 forming packing stations along margins of the table.

A plurality of operators positioned at the packing station bins 4, as indicated in FIG. 4, may quickly pack the fruit in suitable containers, for example, cartons A shown in FIGS. 1 and 2. Along each side of the table 1 is a stand B for supporting bins 4. A take-off conveyor C adjacent each stand provides for conveying filled cartons away from the packing stations.

FIG. 1 shows how apparatus of this invention advantageously may be used in conjunction with fruit sizing apparatus D of which latter, the discharge conveyor elements E operated by drive means F are disposed to deposit fruit of different sizes onto the conveyor means 2.

Referring more specifically to the table 1, it will be seen that it is elongate and the top 5 thereof is of an inverted V-shape in cross section to provide a central ridge 6 and downwardly inclined surfaces 7 and 8 on which latter fruit will roll into the bins 4. Partitions 7' and 8' on the surfaces 7 and 8 are aligned with partitions 4' defining the bins 4 to guide the fruit on the surfaces 7 and 8 into the bins 4. These partitions on the surfaces 7 and 8 and between the bins are adjustable to vary the capacity of the bins for the purpose and by the means to be hereinafter described. The table top is supported above the ground or floor indicated at 9 on a frame structure 10 including suitably braced legs 11.

The bottom 12 of the bins 4 are disposed somewhat below the level of the lower edges of the inclined surfaces 7 and 8 of the table top 5 so as to be readily accessible to operators positioned adjacent the bins.

Arresting means 14 are provided at the lower edges of the inclined surfaces 7 and 8 of the table top 5 to momentarily arrest the gravitational movement of the fruit past these edges into the bins 4. This arresting action will slow down the gravitational movement of the fruit so as to reduce the speed of the drop of the fruit into the bins to prevent bruising or injury of the fruit. The arresting means may consist of an elongate sheet of rubber or similar material forming a curtain 15 which hangs from a support 16 on the table into the path of the fruit, the curtain being vertically slit to define a plurality of depending arresting fingers or strips 17 which will be engaged and deflected by the fruit in the movement of the fruit past the curtain 15 and thereby arrest the gravitational movement of the fruit into the bins 4.

The conveyor means 2 includes a plurality of endless belts, for example four belts 18, 19, 20, and 21, which are substantially horizontally disposed over the inclined surfaces 7 and 8 of the table top 5. The belts 18 and 19 are closely spaced in side-by-side relation and overlie the inclined surface 7, whereas the belts 20 and 21 are similarly spaced and overlie the inclined surface 8. The belts are mounted on shafts 22 and 23, the shaft 22 being driven by means of an electric motor 24 and associated drive means 25 for driving all of the belts.

Each of the endless belts 18, 19, 20, and 21 is supported above the table top 5 on an elongate, hollow frame 26. This frame is open at both ends, has a rectangular box-like form in cross section, and is supported on upright posts 27 suitably fixed on the table top as shown in FIG. 2. The shafts 22 and 23 are suitably supported at and extend across the open ends of the frames 26. The motor 24 for driving the shaft 22 is supported on a bracket 28 at the adjacent end of the table top 5.

The upper run of each of the belts 18, 19, 20, and 21 rides on the upper wall 29 of the frame 26 associated therewith, whereas the lower run of the belt rides on the upper side of the lower wall 30 of the frame.

It should be noted that each of the endless belts 18, 19, 20, and 21 has one longitudinal edge thereof nearer to the inclined surface of the table therebeneath than the other longitudinal edge, since it is desired that fruit conveyed by the belts be moved transversely off the edges that are closer to the inclined surfaces. The fruit is prevented from rolling off the other longitudinal edges of the belts by means of an upright side wall 31 on each belt supporting frame 26, this side wall extending above the belt as shown in FIG. 2.

The conveyor means 2 includes, as hereinbefore stated, the traveling fruit distributing means 3 associated with each conveyor belt and this distributing means operates during its movement over the belt to deflect fruit laterally over the edge of the belt that is nearer to the inclined surfaces of the table. This will lessen the likelihood of bruising or damaging the fruit, since the fruit is not required to drop as great a distance as would be the case if dropped off the other edges of the belts.

The conveyor belts 19 and 21 are spaced from the inclined surfaces of the table a greater distance than the belts 18 and 20. Accordingly, a landing platform 33 for the fruit may be provided in connection with each of the belts 19 and 21, such platforms being approximately midway between the belts and the inclined surface of the table therebeneath. Each landing platform 33 is supported by a bracket 34 and may be suitably cushioned on its upper surface and inclined so that fruit dropping thereon will roll therefrom onto the inclined surface therebeneath. The traveling fruit distributing means 3 for each of the four conveyor belts may be of any suitable form provided that it is capable of moving over the surface of the belt with and relative to the belt in a manner that will cause the fruit contacted thereby to be moved at different points along the belts and laterally over the edges of the belt nearer to the inclined surfaces of the table. In the present instance, each of the deflecting means 3 includes a fruit deflecting member 35 which extends diagonally over the associated belt for sweeping the fruit therefrom as above stated. The deflecting members 35 may be of blade or plate-like form shown, or any other form, provided they will deflect the fruit, without injury, off the side edges of the belts.

Each deflecting member 35 is connected with a motor driven carriage 36 by means of an arm or bracket 37 of an inverted U-shape, the carriage having a friction drive wheel 38 engaged in a grooved track 39 provided on the upper end of the side wall 31 for each belt. A pair of guide wheels 40 are also mounted on the ends of carriage 36 so as to ride on a side portion 41 of the track 39 to support the carriage on the track. The body 42 of the carriage supports an electric motor 43, the shaft 44 of which mounts the drive wheel 38. Electrical conductors 45 for connecting the motor of each carriage with a source of electrical energy, not shown, are carried by a trolley wheel 46 riding on a supporting wire 47 so that as each carriage moves along the track the electrical conductors move therewith.

Suitable means, not shown, may be provided for controlling the rate of travel of the carriages 36 and members 35 with respect to the conveyor belts. Likewise, control means, not shown, but which are responsive to actuation of circuit closers G on the carriages 36 engaging circuit closer actuating pins designated P1 through P16 positioned on the tracks 39, will effect reversal of travel of the carriages at predetermined points on the tracks, so that the carriages will move back and forth relative to the belts while the latter move in the one direction over the table. When the belts and members 35 move at the same rate of speed, the fruit will not be deflected off the sides of the belts, the deflection of the fruit taking place only on the reverse movement of the members 35. However, when the members 34 are moved in the same direction as the belts but at a slower speed, the fruit will be deflected off the sides of the belts during this movement as well as upon the reverse movement of the members 35. The actuating pins P1 through P16 are mounted in openings 39' spaced along the tracks 39 so that they may be variously positioned to change the length of travel of the carriages 36.

The apparatus of this invention is capable of distributing fruit that has been sized uniformly to the various packing station bins 4. It is desired when feeding fruit of different sizes to the apparatus to cause fruit of different sizes to be conducted into different bins 4. As an example of this distribution of sized fruit, the conveyor elements E of the sizer D shown at the left end of FIG. 1 will deliver the smaller size fruit onto the conveyor belt 19, the next larger size fruit onto the conveyor belt 18, and the progressively larger fruit onto the belts 20 and 21, respectively.

As shown in FIG. 1, the belts 18, 19, 20, and 21 may be provided with divider or partition means to be hereinafter identified and which extend lengthwise of and close to the upper surface of the upper run of each of the belts to divide the belt into sections on which fruit of different sizes may be advanced simultaneously on each belt. The partition or divider means may be of variable length per belt with the traveling deflector means 3 arranged to move back and forth and extent according to the length of the partition or divider means.

The belt 19 may be provided with a partition or divider member 48 which extends from the intake end of the belt partway along the belt being supported close to the upper run of the belt by means of a bracket or arm 49 extending from the side wall 31 of the belt as shown in FIG. 2. One of the fruit deflecting units 3 is mounted on the track 39 to reciprocate between circuit closer actuating pins P1 and P2 respectively, located adjacent the intake end of the belt and adjacent the end of the divider means 48, this unit 3 having its deflecting member 35 operable only on one side of the partition member 48 so as to sweep fruit off of the edge of the belt that is closer to the inclined surface of the table thereunder. Fruit deposited on the belt on the other side of the partition member 48 will be advanced past the divider 48 where it will encounter a second fruit deflecting unit 3 which has its deflecting member 35 equal to the width of the belt so that all fruit advanced past the partition member 48 will be engaged and moved off of the belt by the second unit 3. This second unit 3 reciprocates between circuit closer actuating pins P3 and P4 located respectively adjacent the end of the partition 48 and the end of the belt remote from the intake end.

The partitions 7' and 8' on the inclined surfaces 7 and 8 and the bin partitions 4' which are aligned with the partitions 7' and 8' and define the bins 4 are provided with pins 50' fixed thereto and projecting from the underside thereof for insertion in openings 50a in the surfaces 7 and 8 and openings 50b in the bins 4. These openings are spaced whereby the partitions may be removed and replaced to vary the size of the spaces on the table surfaces 7 and 8 between the partitions as well as vary the size of the bins, in the event it is desired that a large amount of fruit be delivered to one or more bins 4, which latter would be then sized by adjustment of partitions 4' to accommodate the fruit. The posts 27 which support the conveyor frames 26 are sufficiently well spaced to avoid interference with adjustment of the partitions 7' and 8' over a wide range.

The belt 18 may be provided with a partition or divider member 48a extending thereover a greater distance along the belt than the partition member on belt 19. The belt 20 may have a partition member 48b of the same extent as the member 48a on the belt 18. The belt 21 may have a partition member 48c mounted thereon and of a length corresponding to that of the partition 48 of belt 19.

One of the deflecting units 3 for the belt 19 is reciprocable an extent equal to the length of the partition or divider 48a, there being circuit closer actuating pins P5 and P6 at the ends of the partition 48a to bring about the reciprocable action of the first unit 3. The other unit 3 for the belt 18 is operable between circuit closer actuating pins P7 and P8 therefor reciprocable for the remainder of the length of the belt 19 beyond the partition 48a.

One of the units 3 for the belt 20 is reciprocable between circuit closer actuating pins P9 and P10 located adjacent the ends of the partition 48b. The other unit 3 for the belt 20 is reciprocable between circuit closer actuating pins P11 and P12 in the same manner as the second unit on the belt 18. The belt 21 has two of the deflecting units 3 operable thereover in the same manner as are the units 3 on belt 19, one of the units 3 being reciprocable between circuit closer actuating pins P13 and P14 and the other between circuit closer actuating pins P15 and P16. It should be noted that the lengths of the partitions or divider elements on the belts and the locations of the circuit closers which determine the extent of reciprocable travel of the deflecting units 3 may be varied as desired by adjusting the pins P1 through P6 to achieve a uniform distribution of fruit of different sizes into selected bins 4 on the table so that the fruit may be quickly and easily packaged without having been bruised or damaged in the handling thereof.

Dividers generally designated R may be provided, as shown in FIGS. 2, 3, and 4, for causing all or part of the fruit dropped from the conveyors 18 and 20 to be delivered to either of the inclined surfaces 7 and 8 on the table or to cause the fruit from belt 18 to be deposited on the inclined surface 7 while the fruit from the belt 20 is deposited on the inclined surface 8. Thus, all of the fruit from these conveyors can be fed to either one of opposite bins 4 or the fruit from one conveyor to one or more bins and from the other conveyor to one or more corresponding bins on the opposite side of the packing table.

As shown in FIGS. 1 and 6, the divider means R may consist of a plurality of upright plate-like members 50 hinged to the ridge 6 of the table and disposed centrally between the conveyor belts 18 and 19. Preferably, each of the members 50 is cushioned on opposite sides and at its upper edge by sheets 51 of soft or pliable rubber or synthetic rubber which provide a flexible tip 51' at the upper edge of the member 50.

As a means for hingedly connecting each divider member 50 to the ridge 6, a plurality of coiled springs 52 are socketed in openings 53 in the ridge and in openings 54 in the member 50, as shown in FIGS. 6 and 7. These springs will hold the members 50 in upright position but will permit the members 50 to be swung to engage the frame 26 in either of the two conveyors 18 and 20, on which latter are mounted detent strips 55 to engage the tips 51' as shown in FIG. 7, for releasably maintaining the members 50 in selected position. It should be noted that the springs 52 and the members 50 are arranged so that normally the latter are elevated slightly above the ridge 6. This will permit depression of the members 50 as may be necessary to engage the tips 51' under the detent strips 55 as well as to disengage the tips from the detent members.

The divider members 50 may be of the same or different lengths but as here shown are equal in length to that of the bins 4. Accordingly, the partitions 7' and 8' and the bin partitions 4' aligned therewith when adjusted from the positions shown in FIG. 1 may be moved an extent equal to the length of two of the divider members 50 to render the two members 50 operable for selectively directing fruit into the enlarged bins 4.

When the divider members 50 are in upright position fruit deflected from the conveyors 18 and 20 will be engaged with opposite sides thereof and drop onto the table surfaces 7 and 8, the cushioning of the members 50 preventing bruising of the fruit and this is aided by the yieldability of these members due to the spring mounting thereof. When the members 50 are adjusted to engage the conveyor 18, all of the fruit deposited from conveyors 18 and 20 will roll onto the surface 8 of the table, whereas when the members are disposed to engage the conveyor 20, all of the fruit from the conveyors 18 and 20 will be deflected onto the surface 7 of the table. It should be noted that the members 50 are selectively adjustable along the length of the table which provides for the desired flexibility in the distribution of fruit of different sizes to predetermined packing stations or bins.

While specific structural details have been shown and described, it should be understood that changes and alterations may be resorted to without departing from the spirit of the invention as defined in the appended claims.

I claim:

1. Apparatus for facilitating the packaging of fruit comprising: a packing table having a plurality of packing stations thereon; said table having an inclined surface extending upwardly from said stations on which fruit will gravitate to said stations; conveyor means disposed horizontally and having opposite side edges above said inclined surface operable to advance fruit over said table; said inclined surface extending transversely beneath and projecting beyond said edges of said conveyor means and distributing means cooperable with said conveyor means for moving the fruit from the edge of said conveyor means remote from said stations onto said inclined surface.

2. The apparatus as defined in claim 1 wherein said conveyor means includes endless belt means movable longitudinally over said inclined surface; said distributing means being movable along said belt means.

3. The apparatus as set fotrh in claim 1 wherein said conveyor means includes a plurality of endless belts extending over said inclined surface; said distributing means being movable relative to said endless belts to deflect the fruit laterally from the edge of each of said belts remote from said stations onto said inclined surface.

4. The apparatus as set forth in claim 1 wherein said conveyor means includes longitudinally extended endless belt means extending over said inclined surface.

5. Apparatus for facilitating packaging of fruit comprising: a packing table, conveyor means for advancing fruit over said table; a track extending along said conveyor means; a carriage movable on said track; means on said carriage extending over said conveyor for sweeping fruit therefrom onto said table; a motor on said carriage; drive means operated by said motor engaged with said track to move said carriage therealong; and means on said carriage and said track cooperable to control operation of said motor and movement of said carriage along said track.

6. Apparatus as set forth in claim 5 wherein said means for controlling operation of said motor includes actuating elements adjustably mounted on said track and circuit closers on said carriage engageable with said actuating elements to control the operation of said motor.

7. Apparatus as set forth in claim 5 wherein said means for controlling operation of said motor includes circuit closers on said carriage and actuating elements for said circuit closers spaced apart along said track and engageable by said circuit closers to control the movement of said carriage.

8. Apparatus for facilitating the packaging of fruit comprising: a packing table; partitions on said packing table providing therebetween a plurality of bins for receiving fruit to be packed; means for adjustably mounting said partitions on said table to vary the size of the bins; said table having an inclined surface extending upwardly from said bins on which fruit will gravitate into said bins; conveyor means disposed horizontally and having opposite side edges above said inclined surface operable to advance fruit over said table; said inclined surface extending transversely beneath and projecting beyond said edges of said means and means cooperating with said conveyor means operable to distribute fruit from the edge of said conveyor means remote from said bins onto said inclined surface.

9. Apparatus for facilitating the packaging of fruit comprising: a packing table having a ridge and surfaces inclined downwardly on opposite sides of said ridge; a plurality of fruit receiving stations along the lower edges of said inclined surfaces to which fruit will roll from said surfaces; yieldable fruit arresting means operable at the lower edges of said inclined surfaces for reducing the speed of the fruit rolling from said surfaces to said stations; conveyor means disposed horizontally and having opposite side edges above said inclined surface operable to advance fruit over said table; said inclined surface extending transversely beneath and projecting beyond said edges of said conveyor means; and means cooperating with said conveyor means operable to distribute fruit from the edge of said conveyor means remote from said bins onto said inclined surface.

10. Apparatus for facilitating the packaging of fruit comprising: a packing table having a ridge and surfaces inclined downwardly on opposite sides of said ridge; a plurality of fruit receiving bins along the lower edges of said inclined surfaces into which fruit will roll from said surfaces; partitions between said bins; partitions on said surfaces aligned with said partitions between said bins; means providing for the placement of said partitions at different locations on said surfaces and in said bins to vary the size of spaces between the partitions on said surfaces and the size of the bins, with said partitions on said surfaces aligned with the partitions between the bins; conveyor means disposed horizontally and having opposite side edges above said inclined surface operable to advance fruit over said table; said inclined surface extending transversely beneath and projecting beyond said edges of said conveyor means; and means cooperating with said conveyor means operable to distribute fruit from the edge of said conveyor means remote from said bins onto said inclined surface.

11. Apparatus for facilitating the packaging of fruit comprising: a packing table having a ridge and surfaces inclined downwardly on opposite sides of said ridge; a plurality of packing stations along the lower edges of said inclined surfaces into which fruit will ro'l from said surfaces; means on said surfaces for directionally guiding the fruit to said packing stations; a plurality of conveyors extending over said surfaces; means cooperable with said conveyors for discharging fruit therefrom onto said surfaces; a plurality of upright members aligned in a row on said ridge; mounting means for said upright members supporting said upright members in upright position operable to permit of movement of said upright members into and from a position inclined to either side of said ridge to control the direction of discharge of fruit onto said surfaces from said conveyors on opposite sides of said ridge; and means for releasably holding said upright members in said inclined postons.

12. Apparatus for facilitating the packaging of fruit comprising: a packing table having a ridge and surfaces inclined downwardly on opposite sides of said ridge; a plurality of packing stations along the lower edges of said inclined surfaces into which fruit will roll from said surfaces; means on said surfaces for directionally guiding the fruit to said packing stations; a plurality of conveyors extending over said surfaces; means cooperable with said conveyors for discharging fruit therefrom onto said surfaces; a plurality of upright members on said ridge between a pair of said conveyors; and mounting means supporting said upright members for movement between an upright position in which fruit from said pair of conveyors is discharged on opposite sides of said upright members and a position inclined to either side of said ridge for directing fruit from both conveyors of said pair to one side of said upright members onto one of said inclined surfaces.

13. Apparatus for facilitating the packaging of fruit comprising: a packing table having a ridge and surfaces inclined downwardly on opposite sides of said ridge; a plurality of packing stations along the lower edge of said inclined surfaces into which fruit will roll from said surfaces; means on said surfaces for directionally guiding the fruit to said packing stations; a plurality of conveyors extending over said surfaces; means cooperable with said conveyors for discharging fruit therefrom onto said surfaces; a plurality of upright members aligned in a row on said ridge; mounting means for said upright members supporting said upright members in upright position operable to permit of movement of said upright members into and from a position inclined to either side of said ridge to control the direction of discharge of fruit onto said surfaces from said conveyors on opposite sides of said ridge; and means for releasably holding said upright members in said inclined positions; said mounting means for said upright members including resilient means secured to said ridge and to said members and which is yieldable to permit said inclination of said upright members.

14. Apparatus for facilitating the packaging of fruit comprising: an elongate packing table having a plurality of packing stations spaced along opposed sides of said table; a pair of inclined surfaces extending upwardly from said packing stations for causing fruit to gravitate to said stations; an endless conveyor belt extending longitudinally of said table above each of said inclined surfaces; said surfaces each extending transversely beneath and projecting beyond the longitudinal edges of the conveyor belt disposed thereabove; and distributing means cooperable with each of said endless conveyors for moving the fruit from the longitudinal edge of said belt remote from said stations onto the respective inclined surface.

15. The apparatus as set forth in claim 14 wherein said fruit distributing means includes partition means extending along the respective belts to divide the same into longitudinal sections separated by said partition means; and means longitudinally movable relative to said partition means to deflect fruit from the respective conveyor belts at locations opposite said partition and from said respective belts at a location beyond said partition.

References Cited by the Examiner
UNITED STATES PATENTS

| | | | |
|---|---|---|---|
| 364,977 | 6/1887 | Vellines | 209—123 |
| 1,481,542 | 1/1924 | Dunsieth | 198—188 |

SAMUEL F. COLEMAN, *Primary Examiner.*

WILLIAM B. LA BORDE, *Examiner.*